Feb. 28, 1950 W. W. MACALPINE 2,498,691

REMOTE CONTROL SYSTEM FOR RADIO RECEIVERS

Filed Sept. 8, 1945 3 Sheets-Sheet 1

INVENTOR.
WILLIAM W. MACALPINE
BY
[signature]
ATTORNEY

Fig. 2.
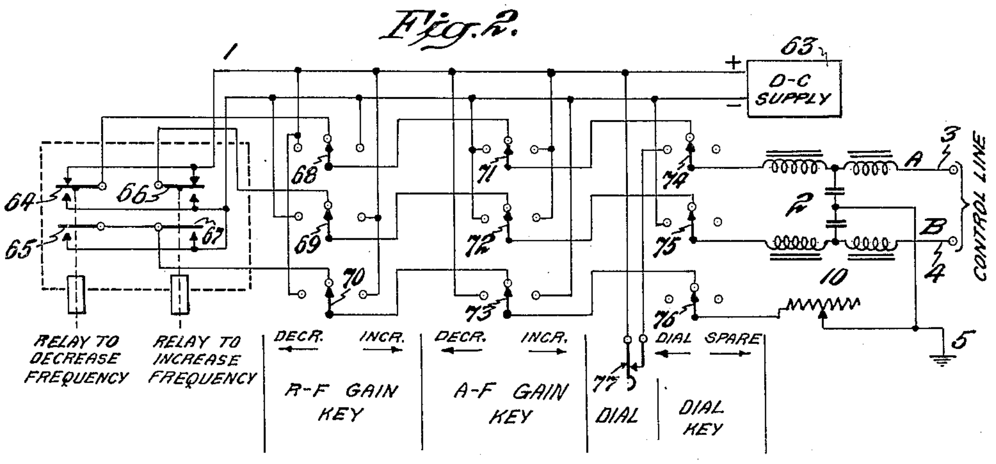
Fig. 3.
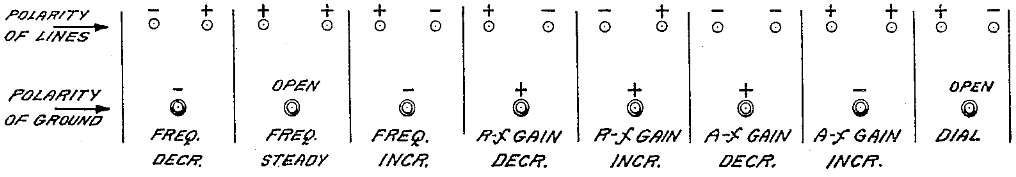
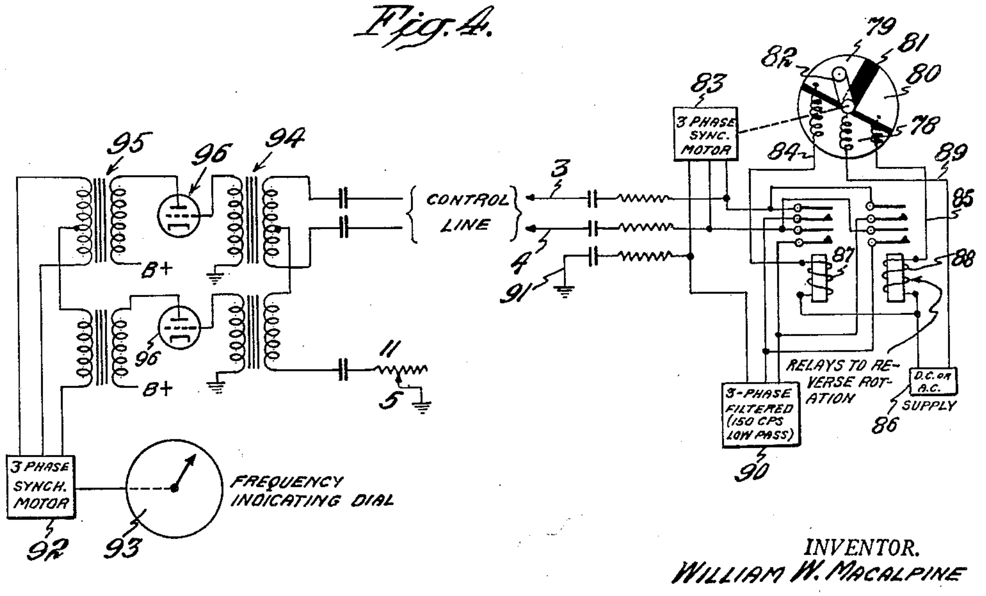
INVENTOR.
WILLIAM W. MACALPINE
BY
ATTORNEY Feb. 28, 1950 W. W. MACALPINE 2,498,691

REMOTE CONTROL SYSTEM FOR RADIO RECEIVERS

Filed Sept. 8, 1945 3 Sheets-Sheet 3

INVENTOR
WILLIAM W. MACALPINE
BY
[signature]
ATTORNEY

Patented Feb. 28, 1950 2,498,691

UNITED STATES PATENT OFFICE 2,498,691

REMOTE CONTROL SYSTEM FOR RADIO RECEIVERS

William W. Macalpine, East Orange, N. J., assignor to Federal Telephone & Radio Corporation, New York, N. Y., a corporation of Delaware Application September 8, 1945, Serial No. 615,130

8 Claims. (Cl. 177—353)

The present invention relates to improvements in remote control systems for radio receiving apparatus and is designed particularly with a view to provide a maximum degree of control effective for precision adjustment of receiving apparatus and to be operable over a minimum of line or cable equipment.

The present invention is effective for accurate and reliable control of the receivers of radio communication systems of the type requiring remote controlled factors or variables from a master or control station such as may be employed in mass maneuvers or in connection with communicating to the multiple gun positions of fighter aircraft where it is desirable to effect like and instantaneous adjustment of the receivers with respect to changes of transmitting frequencies so as to counter inimical attempts to interfere. In accordance with the present improvements the remote control is operable over a standard type of two-wire cable which may be a #22 cable connection between the controlling station and remote receiving apparatus. It is further adapted to meet the multiple adjustment requirements of tuning and of radio and audio frequency gain control under selective control by the operator.

To permit of effecting these multiple functions together with other functions or operations as hereinafter referred to, a circuit arrangement is employed operating over the two-wire line plus grounding and employing therewith arrangements of polarity responsive devices or polarized relays responsive to energizing with varied combinations of polarity current transmitted from the control station upon the operation of polarity selection controlling switches or keys. Included in the added functions which may desirably be included in the operation of the control system are dial indications at the control station synchronized with varied adjustments effected and provision for audio reception at the control station of the receiver audio output channel for monitoring by audition checking of the controlled operations.

The foregoing and other features and advantages of the present improvements will be more fully understood by reference to the accompanying drawings wherein the system of the invention is schematically shown.

In the drawings:

Fig. 2 is a diagrammatic view of switching circuit arrangement of the keying control device for selectively determining the polarity arrangement and energizing of the control line;

Fig. 3 is a related diagram indicating the varied polarity relations with relation to the functions as selectively performed thereby;

Fig. 4 is a schematic view of the indicating circuit and control devices for synchronizing the indicator and controlled dials.

Figure 1:
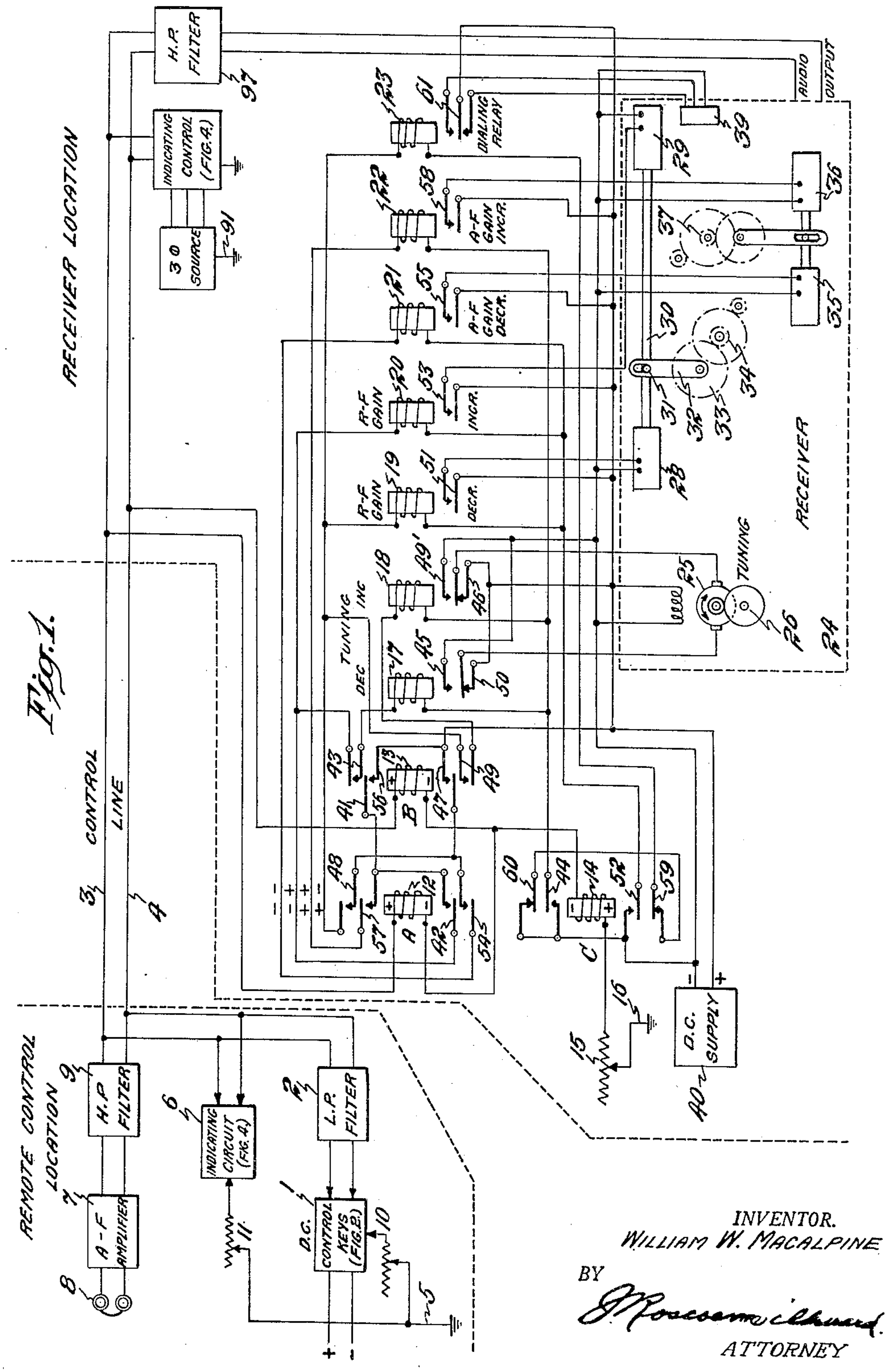
Fig. 1 is a schematic illustration of the improved remote control system operable over a two wire line or cable.

In the preferred embodiment of the invention as schematically illustrated in Fig. 1 the apparatus of the control or master station is shown at the upper left hand position and includes the selective circuit polarity switching or keying device 1 connected to a suitable D. C. source and through the low pass filter 2 to the control line or two wire cable 3—4 as shown. The keying device is shown in detail in Fig. 2 and will be described later. The keying device circuit is likewise connected to ground at 5 and it is operable by selective switch or key actuation to effect varied polarity line connection combined with opened and closed varied polarity grounding to establish a selective multiplicity of control line combinations or circuit conditions for the operation of polarized control devices or magnets connected to the control line and associated with the receiver at a remote location. The control station equipment as shown further includes an indicating circuit or master tuning dial indicator 6 connected to the control line and to ground and likewise an audio frequency amplifier 7 and associated headset 8 connected to the control line through a filter network 9 as indicated. The grounding connections from the keying device 1 and the indicating circuit device 6 are effected through adjustable line compensating resistors 10 and 11.

The polarity responsive control devices energized in response to the varied combinations of current flow under the key selection are here shown consisting of three polarized directional relays A, B and C, the coils 12, 13 and 14 of which are connected in "Y" formation to the respective leads of the control line with the lower leg including the coil 14 grounded through adjustable resistance 15 at 16. Each of the polarized control circuit relays A, B and C alternately operates upper and lower movable contacts, in response to reverse polarity energizing. As indicated, the control relays are adapted to close either upper or lower contacts dependent on the direction of the energizing current flow. The control relay contacts are connected in a separately energized actuating or controlled circuit including relays 17, 18, 19, 20, 21, 22, and 23 each of which operates a movable contact controlling an operating circuit to perform a specific function such as the operation of drive equipment in a given direction connected to the rotors of variable condensers of the receiver or other desired selectively controlled devices.

As diagrammatically shown in Fig. 1 the controlled adjustments of the receiver 24 comprises (1) tuning for frequency selection employing a reversing D. C. motor 25 geared to the rotor shaft 26 of the tuning condenser. (2) Provision for radio frequency gain control for decrease and increase upon energizing of either solenoid 28 or 29 having common movable core 30 provided with pin and lever connection 31—32 for rotating a drive gear 33 suitably geared to rotor shaft 34 of brush contact of a voltage divider associated with the radio frequency amplifying stage. Also geared up to shaft 34 is an eddy-current or other retarding device. (3) A similar control by solenoids 35—36 with drive gear connection to the rotor shaft 37 carrying brush of voltage divider of the audio frequency stage and (4) the control of a stepping switch 39 for dialling or selection of the other functions of the receiver, such as the turning on or off of the beat frequency oscillator and so forth, as will be readily understood.

*Key controlled operations.*—The functions performed by the system insofar as described will be readily understood by reference to Fig. 1 considered with relation to Fig. 2 and Fig. 3 showing diagrammatically the control circuit conditions and polarities established by the operation of the selective keys with indications of the specific functions performed by their operation.

Referred to in the chronological order of the diagram, the first three keying operations control the tuning for frequency selection and are as follows:

*Frequency decrease.*—Operation of the first relay of Fig. 2, marked "relay to decrease frequency" will establish a polarizing of the control relays A, B and C in the order of —, + and — by applying positive potential to control line 4, negative to 3 and effecting a negative ground connection of relay C. This will close the lower contacts of A, the upper contacts of B and the upper front contact of C. As a result thereof the effective circuit established by the then closed contacts will energize relay 17 from the D. C. supply source 40 from positive over contact 41 of B, 42 of A, 43 of B, coil of 17 over contact 44 of C, to negative of supply source 40. This energizing of magnet 17 moves its movable contact to close on normally open contact 45 thus closing tuning motor 25 armature circuit from positive 40 over normally closed contact 46 of relay 18 to motor 25 by right hand lead, thence over the left lead, contact 45 of relay 17 to negative of supply source 40. The direction of current flow will operate motor 25 to effect a decrease frequency tuning adjustment which will continue as long as the control key is depressed, or until the tuning condenser has reached its maximum capacity.

*Frequency steady.*—Under this condition for maintaining the frequency steady without adjustment each of the control lines is connected to positive source and the grounding connection is open so that there is no closed circuit as related to the relays A, B and C. This is a condition as represented by the normal condition of the control keys as indicated in Fig. 2 and is merely a preparatory contact closing relation as required for subsequent operations.

*Frequency increase.*—This is accomplished by operation of the "relay to increase frequency" in Fig. 2, establishing the control line condition for polarity operation of the control relays A, B, and C in the order of +, —, and — by applying positive potential to control line 3, negative to 4 with negative ground connection of C. This key condition is as shown in the third position of Fig. 3 and closes the upper contacts of A, the lower contacts of B and the upper front contact of C. The closed circuits under this condition operate to energize the magnet 18 to effect a reverse current flow for operating motor 25 in the opposite, frequency increasing direction. The effective or closed circuits are then as follows: The control circuit is completed from positive control line 3 energizing coil 12 of A for positive polarity operation with reverse direction return through coil 13 of B to negative line 4 and with the grounded circuit of the Y leg including the coil 14 of C as in the first instance. The actuating circuit closed by the control magnets contacts from the D. C. supply source 40 is then from D. C. supply 40, contact 47 of B, contact 48 of A, over contact 49 of B, coil of 18 to negative source over contact 44 of C. Energizing of relay 18 by closing its front contact 49 completes the motor circuit from supply 40 over normally closed back contact 50 of relay 17 to the motor 25 thence by motor right hand lead to contact 49[1] and thence to negative source 40.

*Radio frequency gain—decrease.*—The control magnet combination to effect decrease of radio frequency gain, is effected by operating a key to establish the effective polarity of control relays A, B and C as shown in the fourth position of chart of Fig. 3. This will close the upper contacts of A, the lower contacts of B and the lower front contact of C. Under this circuit the control relay coils of A and C are connected in parallel through the control line wires, and each is in series with the coil of B. The actuating circuit as then closed energizes as the relay 19 and is from positive of D. C. source 40, contact 47 of B, contact 48 of A, coil 19 contact 52 of C, to negative of source 40. The excitation of relay 19 closes its contact 51 to close an operating circuit for the solenoid 28 from the source 40 as indicated. Solenoid 28 then operates for directional movement of the rotor shaft 34 to decrease the radio frequency gain as is readily understood and will operate as long as its control key is depressed or in closing position, or until the rotor shaft has reached the limit of operation, when it will be stopped by mechanical means inherent in the voltage divider.

*Radio frequency gain—increase.*—The polarity to effect energizing of relay 20 for operating adjustment for radio frequency gain increase prescribes a control relay relation as indicated in Fig. 3, fifth position, wherein the relays B and C are connected in parallel through one control line wire and ground, for positive polarity operation with the control relay A then negatively connected to operate in series relation to both B and C. This closes lower contacts of A, upper contacts of B and lower front contact of C. The resulting closed circuit to energize relay 20 is from D. C. source 40 over contact 41 of B, 42 of A, coil of relay 20, front contact 52 of C to source negative. The operating circuit closed by operation of relay 20 is from source 40 positive over contact 53 of relay 20 to right hand solenoid 29 and thence to source 40. This moves mutual solenoid core 30 to the right for reverse direction adjustment of the controlled voltage divider to effect radio frequency gain increase during the period of keying.

*Audio frequency gain—decrease.*—By suitable control switching or keying, the control relays A, B and C are energized in the relation of negative, negative and positive polarity with lines 3 and 4 connected to source negative and with a positive grounding connection. The closed contacts then include the lower contacts of A and B, and lower front contact of C. This energizes relay 21 by actuating circuit from source positive 40 over contact 47 of B, contact 54 of A to coil 21 and over contact 52 of C to complete the circuit. The energizing of relay 21 closes its contact 55 to complete the operating circuit for solenoid 35 to source 40 thereby to effect decrease adjustment of the audio frequency control grid potential proportional to the duration of keying.

*Audio frequency gain—increase.*—The key switching establishes a control relay polarized relation of A+, and B+ and C−. This closes the upper contacts of A, B, and C and determines an actuating circuit to energize relay 22 from source 40, contact 41 of relay B, contact 57 of A to coil of 22 and over contact 44 of C to source negative. In response to closing of contact 58 of relay 22 an operating circuit including winding of solenoid 36 is completed to effect reverse adjustment of shaft 37 and resulting adjustment for audio frequency gain increase.

*Dial function selection.*—The polarity combination indicated in the final right hand position of Fig. 3 closes the upper contacts of A, the lower contacts of B with C closed on its back contacts. This selectively operates the relay 23 which as diagrammatically illustrated may control a stepping switch 39 for the selective control operation of various functions of the receiver in addition to those specifically controlled by the relays already described. In this instance of keying, the polarity of the control relays A, B and C is in the order of positive, negative and open. The actuating circuit then closed is from source 40, contact 47 of control relay B, over contact 48 of A, relay 23, over normally closed contacts 59 and 60 of C to negative source. The control key in this operating condition may be a dialing key wherein the number of pulses in the signal transmitted will effect selection of a given function of the receiver for operation by stepping operation of the relay 23, moveable contact 61 alternately closing circuits from source 40 over the front and back contact of relay 23 to a stepping switch 39 in the receiver, or in an auxiliary device.

*Control keying device (Fig. 2).*—The switching and circuit arrangement of the control keying device 1 as employed for the varied combination polarity energizing of the control relays A, B and C is diagrammatically shown in Fig. 2. The control keying device for polarity selection comprises multi-contact switches for connecting the control lines 3 and 4 to the D. C. source indicated at 63 in different polarity relation with varied relation connection to ground at 5 as referred to. The respective control keys as indicated with relation to their functions include first and second positions for decrease and increase of frequency tuning and are indicated as relay operated. The succeeding position keying is shown as controlled by multi-contact, reverse adjustment position switches normally assuming a central circuit, preparing position, related to the control lines and ground connection. The control switches include the movable contacts 64 to 76 of which the contact 74 is connected to control line 3, 75 to control line 4 and 76 to ground connection 5. The varied circuit arrangements as effected by the selective closing of the switches will be readily understood from a reading of the diagram and may be briefly traced as follows with reference to the functions performed.

*Tuning—frequency decrease.*—The first position relay opens the normally closed back contact and closes on its front contacts thereby establishing circuit from positive over the succeeding switch contacts 66, 69, 72 and 75 to control line 4 for positive polarity energizing of relay B. The negative source is closed to control line 3 over 64, 68, 71 and 74 for negative polarity energizing of control relay A and is likewise closed to ground over 65, 70, 73 and 76 giving negative polarity of relay C.

*Tuning frequency—increase.*—Second position relay opens its normally closed back contact with closing of front contact, thus completing circuit from source positive over 64, 68, 71 and 74 to line 3 for positive polarizing of control relay A. Negative is closed to relay B over line 4 and 66, 69, 72 and 75 and likewise to ground and relay C over 67, 70, 73 and 76.

*Radio frequency gain—decrease.*—This is effected by turning the key switch closed on the left hand fixed contacts as indicated thus closing positive source to control line 3 and relay A over contacts 68, 71 and 74 and likewise to ground connection 5 and relay C over 70, 73 and 76 while the negative source is closed over 69, 72 and 75 to line 4 and associated relay B.

*Radio frequency gain—increase.*—Shifting of this control key to the right closes source positive over contacts 69, 72 and 75 to line 4 and relay B and over 70, 73 and 76 to ground for positive polarizing of C while negative is closed to A over contacts 68, 71 and 74 and line 3.

*Audio frequency—decrease.*—As indicated shifting of audio frequency gain key to the left will close positive source to ground alone over contacts 73 and 76 while the negative source lead is connected to both control lines 3 and 4 over contacts 71 and 74 to line 3 and over contacts 72 and 75 to line 4.

*Audio frequency—increase.*—Switching to the right for this operation closes source positive to control lines 3 and 4 over contacts 71 and 74 and over contacts 72 and 75 while negative is connected to ground by contacts 73 and 76. This establishes the condition of positive polarizing of control relays A and B and negative polarizing of control relay C required for effecting this function as described.

*Dialing.*—The requirement for this operation as referred to is positive and negative polarizing of control relays A and B respectively and an open ground. This is effected on left hand turning of the dial switch and closes source positive over dial control switch 77 and contact 74 to control line 3 and negative source over contact 75 to control line 4 while ground is opened at 76.

*Indicating control.*—The indicating control circuit and associated equipment is diagrammatically shown in Fig. 4 and is for the purpose of operating an indicating pointer at the control station to correspond to the controlled position and adjustment of an adjusted device such as the tuning condenser at the receiving station as shown. This operation is effected over the two-wire control line and ground connection with the employment of a three-phase alternating current with interposed filter network so as to be non-interfering with the control line circuits for the receiver adjustment. To perform this operation there is provided on the rotor shaft of the tuning condenser a segmental contact disk 78 provided with segmental terminal contacts 79 and 80 insulated by an interposed insulating strip 81 and having operatively related thereto a movable contact 82 connected to be rotated by a three phase synchronous motor 83. The disc member 78 is angularly adjusted with the tuning condenser rotor and has its contact segments 79 and 80 connected to parallel leads 84 and 85 from a potential source 86 with control relays 87 and 88 connected in the parallel leads which have their circuits closed through the movable contact 82 by a return lead 89 dependent on the relative position of the contacts 79, 80 and 82. The motor 83 is as shown connected to be energized from an A. C. supply source 90 under circuit control by phase changing contacts of the relays 87 and 88 which concurrently operate to change the phase relation of the current transmitted over the control lines 3 and 4 and ground 91 in the manner to effect reverse rotation of a drive motor 92 at the control station connected to drive the pointer of an indicating dial 93 at the master or control station.

In its operation, upon angular displacement of the insulating strip 81 with relation to the contact 82 upon adjustment of the tuning condenser a circuit condition will be established operating to move the contact 82 and likewise synchronously the pointer of indicating dial 93 in the direction to effect registration of contact 82 with the insulating strip 81 which upon occurrence will open the circuits of the operating control relay 87 or 88 to cause the cessation of drive motors 83 and 92 and thereby indicating on the dial 93 the adjustment of the tuning condenser. It will be observed that the form of control just described permits the stopping of the pointer of dial 93, as well as the adjustments of the tuning condenser, in any one of an infinite number of settings, that is, the points of stopping of the condenser rotor and the dial pointer are not limited to a fixed number of rigidly spaced angular positions about the axis of rotation, as in many prior art devices, but on the contrary the cessation of rotation can occur with perfect precision at whatever point happens to be correct for exact adjustment; and as the number of such points about the circumference of a circle is "infinite" in the sense of being not limited to any specific number of angular degrees or fraction of degrees, the important advantage of such precise control over the much coarser type of control found in a finite (fixed number of spaced points) system is readily apparent. Associated with the motor 92 of the control station the operating circuit for the motor is as shown, coupled to the control line and ground circuit 5 by a transformer arrangement employing divided coil transformers 94 and 95 of the interphase or Scott type and wherein the primaries of the transformers 95 are externally excited and are under grid control of the secondaries of the transformers 94 by means of the grids 96 of the thermionic tubes as shown having their anodes connected to the primaries of transformers 95. The electrical and electronic elements just referred to operate as an amplified telemetering system for causing rotation of the motor 92 in exact synchronism with the correspondingly constructed motor 83; it being noted that the frequency of excitation of the amplifiers 96 as well as the timing of the successive exciting pulses, corresponds to that of the circuits leading to the motor 83, and therefore the two motors 92 and 83 will be in step one with the other throughout the cycle of operation. The step of power amplification is introduced on the assumption that the elements 92 and 93 require more power for their operation than is available from the primary circuit of the transformers 94; but if the reverse is true in any given installation the step of amplification may, of course, be omitted.

*Audible frequency monitoring.*—In addition to the visual indication of the control condition as just referred to, there is further incorporated means for monitoring or audibly checking of the receiver operation by the employment of an audible frequency amplifier 7 having a headset 8. As shown in Fig. 1 connection is made from the audio output of the receiver through a high pass filter 97 to the control line and through like filter 9 to the amplifier 7 thus to enable listening in on the receiver operation for the supervision thereof and copying of messages the filter functioning to cut out control circuit noises from the audio amplifier.

While there is diagrammatically shown and described a preferred embodiment of the features of the invention, it will be understood that varied modifications may be made therein without departing from the scope of the invention as defined in the appended claims such as with the employment of varied types of accessory equipment and the connecting of the control relays in any other manner considered more appropriate in any given situation. Further, the polarity responsive means, in place of the polarized directional control relays may consist of three resistor loads in Y or delta arrangement connected to control grids of tubes controlling ordinary relays.

Figure 5:
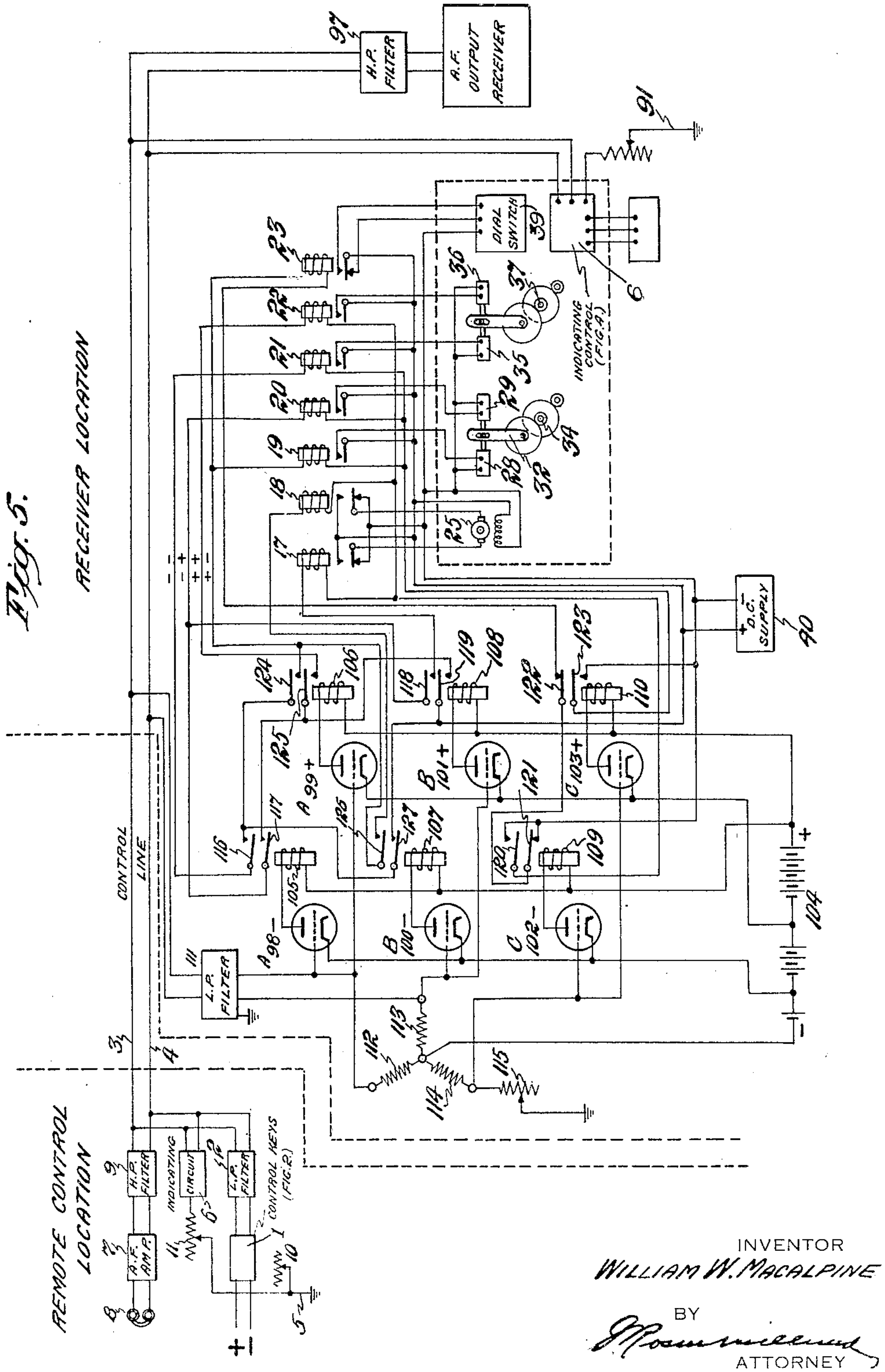
Fig. 5 shows, diagrammatically, a modification.

An example of the latter type of control is shown in the modification of Fig. 5 wherein a grid-biased tube circuit and valved energy source is employed responsive to altered polarity keying of the control line for operation by means of common or non-polarized control relays.

In this modification the control station equipment, controlled circuit (including relays 17 to 23) and operating circuits and equipment associated therewith are similar to that as first described and is so indicated by the use of corresponding reference characters applied thereto. The controlling and actuating circuits are altered to include separate energizing of the former from an independent source under trigger action or valving control of grid biased tubes A98, A99, B100, B101, C102 and C103 responsive to the control line polarity. The relative biasing of the tubes is such that in their operation the tubes A98, B100 and C102 will be normally energized with small negative biasing, to be blocked on greater negative bias for operating control, responsive to negative biasing corresponding in action to that of the negative polarized side of the control magnets A, B, and C of the first form. The operating control by the tubes A99, B101, and C103 is responsive to positive biasing thus to simulate the action of the positive polarity condition of the first embodiment relays A, B, and C respectively. The contacts controlled by the relays similarly correspond in action to the negative and positive side contacts of the control relays A, B, and C referred to and accordingly the paired negative and positive bias responsive tubes and associated relays constitute polarity responsive devices as in the first embodiment.

The controlling grid circuit and the energizing source for the plate circuit of the tubes as shown includes a suitable D. C. source indicated as a battery 104 having its positive side connected to the plates or anodes of the tubes as indicated over or in series with the coils of the relay magnets 105 to 110 each of which is associated with a tube. The cathodes of the tubes are tapped onto the battery at two points near the negative end. The control circuit arrangement includes connection through a low pass filter 111 from the control lines 3 and 4 in the arrangement where control line 3 is in circuit with the grid of tubes A98 and A99 and the control line 4 is similarly connected to the grids of tubes B100 and B101. The grids of all tubes also as shown are connected to the negative side of battery 104 through the line load resistors 112, 113, 114 connected in Y arrangement to the respective paired tubes. The grids of the paired tubes C102, C103, to be responsive to ground circuit, are connected in shunt relation to the line load resistors and to ground through the adjustable line compensating resistor 115.

*Operation.*—The operating circuit conditions established by the operation of the selective keying device of Fig. 2 in accordance with the diagram of Fig. 3 is as follows:

*Frequency decrease.*—Operation of the first relay switch will determine as noted a polarity of the control line 3 and 4 as negative and plus and will effect a negative ground connection of the grids of tubes C102 and C103. This condition will apply negative bias to the grid of tube A98 blocking its current flow whereby the coil of 105, normally energized, will release its back contacts 116, 117 into closed circuit relation. From the control line 4 the positive potential is effective with relation to the right hand tube B101 operating energizing coil 108 to close contacts 118, 119 and the closed negative ground circuit will be effective to block the tube C102 to close its upper back contact 120 and open lower front contact 121. A circuit is thus completed for energizing of the tuning or frequency decrease relay 17 from supply source 40 positive over closed contact 119, 117, thence over contact 118 through the coil of relay 17 and thence over contact 120 to negative supply. Energizing of relay 17 will result in closing of the operating circuit of motor 25 in the direction for frequency decrease.

*Frequency steady.*—As noted from Fig. 3 the second keying position applies positive polarity to the lines 3 and 4 with an open circuit condition as related to the ground. In this condition no current flows through the line lead resistors 112, 113 and 114 and the tubes remain biased in their normal conditions. The relays 105, 107 and 109 therefore remain energized, and 106, 108 and 110 remain unenergized. Relays 17 to 23 thus remain unoperated. Regarding relays 17 and 18, being unoperated, no voltage is applied across the armature 25 of the tuning motor and consequently the tuning drive is not operated, or the frequency remains steady, or not adjusted.

*Frequency increase.*—This determines control line polarity of 3 positive and 4 negative with negative polarity of the grounding circuit. This condition establishes current flow through tube A99 by positive biasing of its grid thereby closing contacts 124, 125 of its associated relay 106. It likewise blocks tube 100 by negative biasing of its grid to effect closing of the back contacts 126, 127 and as heretofore explained, likewise would energize coil 109 by negative blocking of tube C102 while its paired tube C103 remains with a closed condition of the contact 122. The effective or closed actuation circuit for relay 18 is then as follows: From D. C. supply 40 positive over contacts 127 and 124 thence over contact 126 to relay coil 18 and over contact 120 to negative D. C. supply. This energizing of relay 18 as heretofore explained in connection with Fig. 1 operates motor 25 in the direction to effect frequency increase.

*Radio frequency gain—decrease.*—The control polarity to effect decrease of radio frequency gain is effected by key control establishing a polarity arrangement of control line 3 positive and 4 negative and with positive polarity of the ground circuit. This control polarity relation alters the conditions of tubes A99, B100 and C103 closing the actuating circuit supply from D. C. supply 40 positive over contacts 127 and 124, over coil of relay 19 and over contact 123 to supply 40 negative. The energizing of relay 19 closes an operating circuit to solenoid 28 as heretofore referred to.

*Radio frequency gain—increase.*—As indicated in the diagram of Fig. 3 the polarity of the control lines is now 3 negative 4 positive with positive polarity of ground. This establishes an operating circuit condition closing the actuating circuit to relay 20. This control polarity effects negative grid bias blocking of tube A98, to permit closing of contacts 116, 117, the operation of tube B101 by positive grid bias and likewise current flow through tube C103 by reason of positive grid bias. The actuating circuit closed to the coil of relay 20 is from D. C. supply 40 positive over contact 119, contact 117 to relay coil 20 and to negative of the supply over contact 123 of relay 110. This will accordingly close the operating circuit controlled by the relay 20 to effect radio frequency gain increase.

*Audio frequency gain—decrease.*—As indicated the keying polarity to determine this operation is control lines 3 and 4 negative with positive polarity of the grounding circuit related to the operation of the relay C102 and C103. This energizes the operating circuit relay 21 by closing its circuit from D. C. supply 40 positive over 127, over contact 116 to relay coil 21 and thence to negative over contact 123 of relay 110. This accordingly closes the operating circuit of solenoid 35 as referred to, to effect decrease of audio frequency gain.

*Audio frequency gain—increase.*—The keying polarity arrangement to effect this operation is control lines 3 and 4 each positive with negative polarity of the grounding circuit. The closed actuating circuit now includes the relay 22 controlling the operating circuit of solenoid 36. This circuit is now closed from D. C. supply 40 over contact 119, 125 to the relay coil 22 and thence to supply negative over contact 120 of relay 109.

*Dial function selection.*—The polarity combination employed for this feature consists of control line 3 positive, control line 4 negative with open ground circuit. This selectively operates the relay 23 which may control a stepping switch 39 for the selective control operation of various functions of the receiver. The actuating circuit then closed to the coil of relay 23 is from D. C. supply 40 positive over contact 127 over contact 124 to coil of relay 23 and thence to negative of supply 40 over contacts 122 and 121.

What is claimed is:

1. A remote control system comprising a control station, at least one receiving station to be controlled, three conducting control channels one of which may be ground, connecting said control station and said receiving station, three polarised relays at said receiving station connected in said channels in Y formation, each of said relays having contacts operable when current flows through its winding in one direction and other contacts operable when current flows through its winding in the other direction, a source of substantially constant voltage, keying means for connecting said source selectively to said channels so as to apply positive or negative potential to any channel in a predetermined arrangement, whereby said polarised relays may be operated in corresponding predetermined manner, a plurality of additional relays, each of said additional relays having its winding connected between contacts of two of said three polarised relays, a second source of substantially constant voltage connected to the contacts of said three relays, whereby the operation or nonoperation thereof will control the operation of said additional relays, a plurality of intelligence receiving devices at said receiving station, and circuit means controlled respectively by said additional relays for selectively adjusting the position of said devices.

2. A remote control system according to claim 1 in which the receiving station is a radio receiver having an audio output and further comprising a filter network, an audio frequency amplifier, means for connecting the output of said receiver through said amplifier and filter network to said control channels, and means at the control station for receiving the audio signal from said channels so as to monitor the control of said receiver.

3. A remote control system according to claim 1 in which the receiving station is a radio receiver, and further comprising a dial key included in said keying means, and a circuit in said receiver controlled by said dial key, and a stepping switch in said receiver connected to said circuit and controlled thereby.

4. A remote control system according to claim 1 and further comprising an indicating dial at the control station having a movable pointer, a multiple phase driving motor connected to said pointer, an energizing circuit for said motor coupled to the control channels through an interphase transformer, control circuit means for the indicator dial motor associated with the receiver and comprising a segmental contact member connected to be rotatable with one of the intelligence receiving devices and having an intermediate division strip of insulating material, a rotatable contact member associated therewith, a three-phase reversing motor connected to drive the latter contact and forming part of the circuit for controlling the intelligence receiving devices and circuit means for connecting said segmental contact member with said channels.

5. A remote control system according to claim 4 in which the interphase transformer associated with the multiple phase drive motor for the pointer at the control station comprises two sections connected by thermionic tubes.

6. A remote control system according to claim 1 in which the controlled station is a radio receiver and further comprising an indicating dial at the control station having a movable pointer, a reversing motor connected to the pointer, a filter network, an energizing circuit connecting said motor through said filter network to the channels, a control circuit associated with the receiver and connected to the control channels through a filter network, whereby adjustment of an intelligence device in the receiver operates said motor to move said indicating dial to a corresponding position.

7. A remote control system according to claim 6 in which the control station is provided with a headset and connections are provided at the receiving station from the output of the receiver to the control channels through a filtering network to permit audible monitoring of the receiver operation.

8. A remote control system as disclosed in claim 1 in which means is provided to transmit back over the transmission channels an indication of the position of the particular adjusting device of the apparatus being controlled without affecting the controlling function.

WILLIAM W. MACALPINE.

REFERENCES CITED

The following references are of record in the file of this patent:

UNITED STATES PATENTS

| Number | Name | Date |
|---|---|---|
| Re. 13,514 | Ryan | Jan. 14, 1913 |
| 1,826,845 | Trogner | Oct. 13, 1931 |
| 1,937,375 | Woodward | Nov. 28, 1933 |
| 1,944,326 | Hudson | Jan. 23, 1934 |
| 2,007,165 | Hulse | July 9, 1935 |
| 2,039,827 | Nicholson | May 5, 1936 |
| 2,321,699 | O'Brien | June 15, 1943 |
| 2,338,872 | Robidoux | Jan. 11, 1944 |
| 2,348,666 | Wallace | May 9, 1944 |
| 2,424,243 | Lowell | July 22, 1947 |

FOREIGN PATENTS

| Number | Country | Date |
|---|---|---|
| 298,677 | Great Britain | Oct. 15, 1928 |
| 445,926 | Great Britain | Apr. 21, 1936 |
| 466,281 | Great Britain | May 26, 1937 |